United States Patent
Paine et al.

[15] 3,675,712
[45] July 11, 1972

[54] METHOD FOR CONTROLLING VAPOR CONTENT OF A GAS

[72] Inventors: T. O. Paine, Administrator of the National Aeronautics and Space Administration with respect to an invention of; Billy G. Moser, Chico; Robert F. Landel, Altadena, both of Calif.

[22] Filed: Dec. 16, 1969

[21] Appl. No.: 885,521

[52] U.S. Cl.........................................165/3, 165/20, 62/93
[51] Int. Cl...............................................F24f 3/14
[58] Field of Search............................165/3, 19, 20, 60, 111; 203/49, 87; 261/121, 140, 152, DIG. 34; 73/1 R; 62/93, 92

[56] References Cited

UNITED STATES PATENTS

| | | | |
|---|---|---|---|
| 2,332,975 | 10/1943 | Palmer | 62/92 |
| 2,185,047 | 12/1939 | Weinstein | 165/3 X |
| 2,164,718 | 7/1939 | Norman | 126/113 |
| 1,788,447 | 1/1931 | Buck | 126/113 |

Primary Examiner—Charles Sukalo
Assistant Examiner—W. C. Anderson
Attorney—G. T. McCoy, J. H. Warden and Monte F. Mott

[57] ABSTRACT

A method and a system for controlling vapor content of a gas, particularly suited for use in controlling the relative humidity of the gas delivered to an environmental test chamber, characterized by the utilization of a pressurized source of gas operatively coupled with an hermetically sealed system including a saturation tank containing a vaporific liquid, having an inundated gas intake port and an elevated gas discharge port, coupled with a condenser including a plurality of series-connected condenser units seated in a chilled bath and maintained at a selected temperature whereby a gas first is caused to become saturated with a vapor of the liquid contained within the saturation tank and then selectively dried at the condenser as selected quantities of the vapor are removed by condensation as the gas is delivered therethrough, a feature of the invention being the use of a saturation tank for completely saturating the gas with a vapor followed by a selective cooling of the gas to achieve a condensation of selected quantities of the vapor, whereby the final vapor content of the gas is a function of its temperature.

1 Claim, 1 Drawing Figure

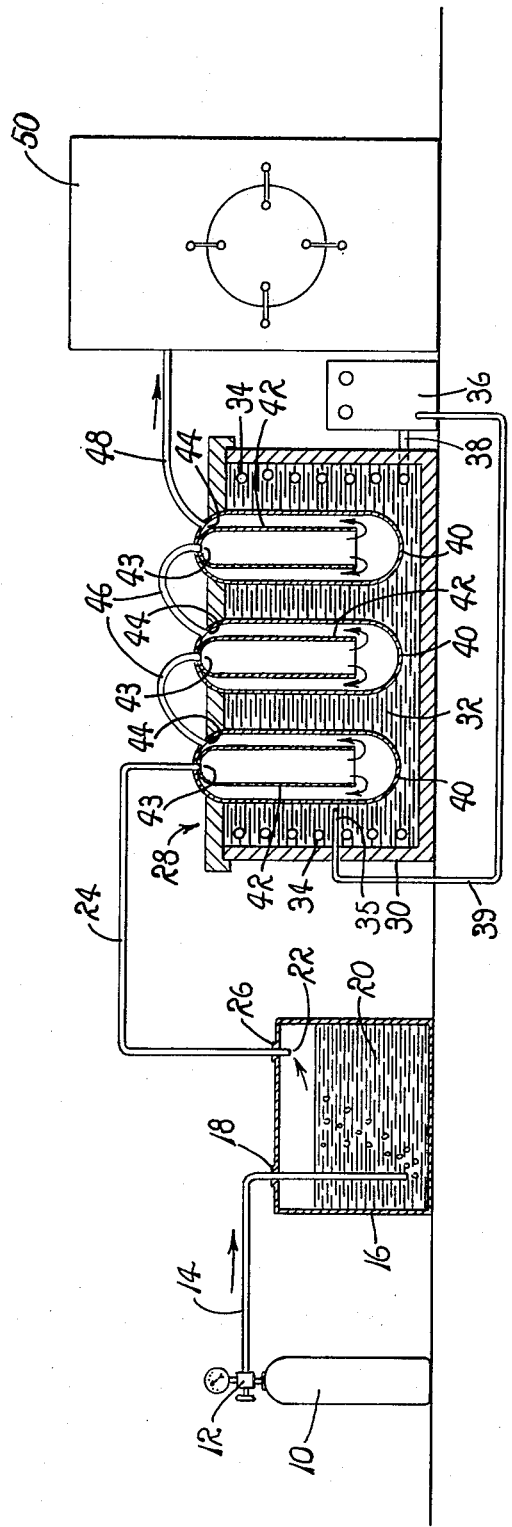

METHOD FOR CONTROLLING VAPOR CONTENT OF A GAS

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The invention relates to a method and a system for selectively removing quantities of vapor from a gas and more particularly to a method and a system for achieving precisely controlled humidity in a gas as it is delivered to an environmental test chamber.

2. Description of the Prior Art

Methods and systems heretofore employed in controlling the humidity of a gas as it is delivered to an environmental test chamber, or the like, normally employ a series of devices which serve completely to dehumidify the gas and then to restore the humidity to a predetermined level. Precision control of the humidity of the gas as it is delivered is limited by the quality of the humidifier. Normally, such systems are quite expensive and have an error factor of 1 to 3 percent. Furthermore, previously employed systems of the type which utilize refrigerant coils tend to be inflexible, due to an inherent inability to vary the temperature of the condensing refrigerant within the cooling coils for achieving variations in the dehumidification. Attempts have been made to overcome the aforementioned disadvantages through the use of drying towers of silica gel as well as molecular sieve materials for extracting the vapor from a gas. However, even these systems have not fully met existing needs as normally they require complex valving structure and extremely sensitive, highly reliable sensing instruments.

OBJECTS AND SUMMARY OF THE INVENTION

This invention overcomes many of the aforementioned difficulties through the use of a novel system including a saturation tank adapted to saturate a gas with a selected vapor, preferably water vapor, to provide a vapor-bearing gas and a condenser adapted to remove the vapor in controlled increments.

Accordingly, an object of this invention is to provide an improved method for controlling the vapor content of a gas.

Another object is to provide an improved method for controlling the humidity of a gas.

Another object is to provide a simplified, economic and effective method for controlling the vapor content of a gas delivered to an environmental test chamber.

Another object is to provide an improved, simplified and effective system for controlling the vapor content of a gas without employing a vapor detector feed-back loop.

Another object is to provide an improved vapor control system for controlling the water vapor content of a gas delivered under pressure to an environmental test chamber.

Another object is to provide an improved system which includes means for first saturating a given gas with a vapor and then condensing accurately controlled quantities of the vapor from the gas.

Another object is to provide an improved system for acquiring precise humidity control as a function of gas temperature.

Another object is to provide a simplified system for controlling humidity employing a vapor saturation station and a condensation station aligned in series and adapted to employ a minimum number of moving components and having a capability of achieving precise control of humidity within less than 1 percent over a wide range of gas temperatures.

BRIEF DESCRIPTION OF THE DRAWING

The drawing is a schematic view of a typical system embodying the principles of the present invention wherein there is provided a pressurized source of gas, a vapor saturation station followed by a condensation station wherein a selected quantity of vapor is removed from the vapor-saturated gas through a condensation thereof.

DESCRIPTION OF THE PREFERRED EMBODIMENT

In the drawing there is illustrated a system which employs a source 10 of pressurized gas, the output of which is controlled by a valve 12. While the source is illustrated as a pressurized bottle, it should readily be apparent that the source may be any suitable supply and that the system is not limited to use with a bottled gas.

From the output of valve 12 there is extended a conduit 14. This conduit is projected downwardly into an hermetically sealed, saturation tank 16 and terminates with its discharge opening disposed near the bottom surface of the tank. A convenient grommet 18 couples the conduit 14 to the tank in a sealed relation thereto. The tank is substantially filled with a selected vaporific fluid 20. Consequently, the fluid inundates the output of the conduit 14 so that the pressurized gas is forced to bubble through the fluid, as it is discharged from the conduit 14, for thus becoming saturated with the vapor of the liquid.

The tank 16 also includes a gas discharge port 22 arranged above the level of the fluid 20. This port comprises the input of a discharge conduit 24 extending from within the tank through a convenient grommet 26 mounted thereon. Since the discharge port 22 is arranged above the level of the liquid within the tank 16, the saturated gas is permitted to escape the tank while the liquid is retained therein. The conduit 24 serves to deliver the saturated gas from the discharge port 22 to a condenser 28 where a selected portion of the vapor acquired at the tank 16 is removed from the gas. This removal is achieved through a condensation and/or freezing process.

The condenser 28 includes an insulated and sealed tank 30 filled with a refrigerant 32 of any convenient composition capable of remaining in a liquid state as the temperature thereof is reduced to an operative level.

Within the tank 30 there is provided a plurality of refrigerant coils 34 through which a suitable fluid refrigerant is circulated for lowering the temperature of the refrigerant continuously is monitored by a probe 35 inserted within the tank 30. The coils are connected with a refrigerant control unit 36 through a coupling 38 while the probe is connected thereto by a lead 39. The unit 36 serves to respond to detected changes in the temperature of the refrigerant 32 for imposing a selected temperature thereon. The unit 36 is of any suitable design, therefore, a detailed description of the unit is omitted.

Also disposed within the tank 30, in engagement with the refrigerant 32, there is a plurality of series-connected bottles 40. Each of the bottles receives therein a concentric, downwardly directed, bottomless bell 42 having a gas intake opening 43 in the upper portion thereof for receiving gas as it is delivered to the bottle.

Within the wall of the upper portion of each of the bottles 40 there is a discharge port 44 which serves to deliver gas from the bottle. From the discharge ports 44 there is extended a conduit 46 which serves to deliver the gas from the discharge ports to the intake openings 43 of the adjacent bottles. Therefore, it should be apparent that as gas, under pressure, is delivered downwardly through the bell 42, it is chilled as it is permitted to circulate upwardly in contact with the internal surface of the wall of the bottle 40 as it escapes from the bottle through the port 44 into the conduit 46, whereupon it is delivered for circulation and further cooling within the adjacent bottle 40.

Consequently, as the gas is delivered through the series of bottles, it is caused to transfer its heat to the refrigerant 32, through the walls of the series-connected bottles of the condenser. In practice, the temperature of a refrigerant 32 is at a point below the dew point of the vapor delivered to the gas and preferably below the freezing point of the resulting condensate, particularly where the humidity is being reduced to minimal quantities. Hence, it is to be understood that the lower portion of each of the bottles 40 serves as a trap wherein the vapor condensate is collected and, where desired, is frozen. It is to be understood that the velocity of the gas flow is slow enough for the vapor to be in equilibrium with the condensate, whether it is in a solid or gaseous state.

As a practical matter, it has been found that where the gas is being dehumidified, a grouping of three traps in series has proven adequate to achieve precise and flawless humidity control to a fraction of 1 percent over temperature ranges from room temperature to about minus 50° C.

As presently employed, an output conduit 48 of the condenser 28 is connected between the discharge port 44 of the last-in-line bottle 40 and an environmental test chamber 50 so that the humidity of the chamber is accurately controlled by controlling the quantity of water vapor retained by the gas as it is delivered to the chamber from the condenser 28. However, it is to be understood that the conduit 48 may be employed in delivering gases of various types to various types of chambers.

OPERATION

It is believed that in view of the foregoing description, the operation of the device will be readily understood and it will be briefly reviewed at this point. In operation, gas is delivered to the environmental test chamber 50 from any suitable pressurized source 10. The flow of gas from the source is controlled by manipulating the valve 12 to establish a selected constant pressure for the gas as it is delivered through the system. The gas, as it is delivered from the valve 12 through the conduit 14, is bubbled through a selected liquid 20 contained in the saturation tank 16. As the gas is bubbled through the liquid, it becomes saturated with the vapor of the liquid and is permitted to escape as vapor-saturated gas from the discharge port 22. The saturated gas then is delivered to the first-in-line bottle 40 of the condenser 28. The condenser 28 is maintained at a selected temperature throughout the operation by the refrigerating control unit 36 as it drives a refrigerant through the coils 34.

As the gas is discharged into the bottle 40, through the bell 42, it is permitted to become chilled through contact with the walls of the bottles. As the gas is chilled, the vapor condenses and, where water vapor is being extracted from the gas, the water condensate is permitted to freeze. The partially dehumidified gas is then permitted to escape to the adjacent bottle 40, through the coupling conduit 46, and again chilled for condensing further quantities of water vapor. In practice, this step is repeated a third time.

Since the water condenses and freezes, and is therefore trapped, it is desirable to have an additional set of condensation traps available for standby operations for replacing the bottles 40 as they are filled with frozen condensate. The bottles may be "defrosted" by any suitable device for subsequent reuse.

As a practical matter, where the system embodying the principles of the present invention is employed as a dehumidifier, precise control within an error range of less than 1 percent over a wide range of temperatures has been achieved. The system has been extensively utilized and has given excellent results with temperatures ranging between minus 50° C. and room temperature. As a practical matter, the system may be employed at room temperatures for certain operative conditions where the temperature and pressure conditions within the conduits are such as to preclude an occurrence of condensation within the conduits.

In view of known principles, it should readily be apparent that where greater quantities of vapor are to be extracted from the gas delivered by the system, the refrigerating unit 36 is adjusted for lowering the temperature of the refrigerant 32. Conversely, should it be desired to remove a lesser quantity of vapor from the gas prior to its delivery to the environmental test chamber, the unit 36 is adjusted for increasing the temperature of the refrigerant 32. Furthermore, since the refrigerant 32 is intended to serve as a heat exchange medium, the refrigerant may be a cooled gas.

In view of the foregoing, it should readily be apparent that the method and system embodying the principles of the present invention accommodates an efficient and controlled removal of selected quantities of a given vapor from certain gases.

Although the invention has been herein shown and described in what is conceived to be the most practical and preferred method and system, it is recognized that departures may be made therefrom within the scope of the invention.

What is claimed is:

1. In a method for controlling the water vapor content of a gas prior to its being delivered to an environmental test chamber, the steps of:
   A. bubbling the gas through a body of water for completely saturating the gas with water vapor;
   B. successively cooling the gas in successive stages for extracting a selected quantity of the vapor as a condensate from the gas at each of the stages; and
   C. freezing the condensate, whereby the gas is delivered to the environmental test chamber with a preselected vapor content.

* * * * *